(12) United States Patent
Hyatt et al.

(10) Patent No.: US 7,759,820 B2
(45) Date of Patent: Jul. 20, 2010

(54) CONNECTION ERROR AVOIDANCE FOR APPARATUS CONNECTED TO A POWER SUPPLY

(75) Inventors: Steven John Hyatt, England (GB); Ian David Judd, Hampshire (GB); Robert Bruce Nicholson, Hampshire (GB); Paul Jonathan Ouelch, Hampshire (GB); Stephen Arthur Randle, Hampshire (GB); William James Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/836,065

(22) Filed: Aug. 8, 2007

(65) Prior Publication Data

US 2007/0277062 A1    Nov. 29, 2007

(30) Foreign Application Priority Data

| Feb. 11, 2005 | (GB) | ................................. 0502829.5 |
| Jan. 18, 2006 | (WO) | ..................... PCT/EP06/50286 |

(51) Int. Cl.
    *H02J 9/00*    (2006.01)
(52) U.S. Cl. ...................................... 307/64
(58) Field of Classification Search ............. 307/64–66; 324/763–765, 771
    See application file for complete search history.

(56) References Cited

U.S. PATENT DOCUMENTS

| 5,059,889 | A | * | 10/1991 | Heaton ....................... 323/285 |
| 5,583,440 | A | | 12/1996 | Bisher ......................... 324/426 |
| 6,236,226 | B1 | | 5/2001 | Hagiwara .................... 324/771 |
| 6,876,219 | B2 | * | 4/2005 | Vollrath ....................... 324/765 |
| 6,949,942 | B2 | * | 9/2005 | Eldridge et al. ............. 324/765 |
| 6,975,978 | B1 | * | 12/2005 | Ishida et al. .................. 703/15 |
| 7,005,867 | B2 | * | 2/2006 | Hashimoto .................. 324/713 |
| 7,119,547 | B2 | * | 10/2006 | Matsuura et al. ............ 324/537 |
| 2001/0011845 | A1 | | 8/2001 | Simonelli et al. ............. 307/66 |

OTHER PUBLICATIONS

Search Report and Written Opinion from PCT application No. PCT/EP2006/05286 which was mailed on Sep. 22, 2006.
Office Communication from EP Application No. 06707746.1-2224 which was mailed on Oct. 6, 2009.

* cited by examiner

*Primary Examiner*—Albert W Paladini
(74) *Attorney, Agent, or Firm*—Zilka-Kotab, PC

(57) ABSTRACT

According to a first general aspect of the present invention, there is provided a logic arrangement for reducing incidence of errors in connections between a power consumer apparatus and a power supply apparatus, the logic arrangement comprising: a pattern-generating component for generating an identifiable pattern in a load to be drawn from a power supply connection to a power supply apparatus; and a testing component for monitoring across a signal connection to the power supply apparatus, the testing component monitoring for a change in the load corresponding to the pattern. A positive result of the testing by the testing component indicates a correct configuration. Additional embodiments are also presented.

32 Claims, 3 Drawing Sheets

CONNECTION ERROR AVOIDANCE FOR APPARATUS CONNECTED TO A POWER SUPPLY

FIELD OF THE INVENTION

The present invention relates to methods and apparatuses for improving reliability of systems connected to "intelligent" power supply apparatus. In particular, the invention relates to improved connection error avoidance in apparatus connected to intelligent uninterruptible power supply (UPS) apparatus.

BACKGROUND OF THE INVENTION

In the data storage field, many data storage products contain some memory which is used to store data which is regarded as non-volatile. This data is rendered non-volatile by a combination of software, an intelligent external Uninterruptible Power Supply (UPS) and a disk drive. (An intelligent UPS is one which is capable of controlling and monitoring its operating condition and responding to signals, preferably via a signal cable. The reliability, availability and serviceability of such systems is thereby enhanced over that of conventional "unintelligent" apparatus.) The software at a node connected by the signal cable monitors the state of the UPS and the supply to the UPS, and if it detects that main power to the UPS has failed, it initiates a process by which the contents of the memory are written out to the disk. This process occurs under power from the UPS. Once the data has been copied from memory to disk, the storage product hardware is powered down.

The connection between a storage product and a conventional intelligent UPS consists of a power cable and a separate signal cable, typically in the form of an RS232 (serial) connection. Due to the physical design of the commercially available UPSs that are typically used, it is physically possible to plug the power cable into one UPS and the data cable into a different UPS. The same difficulty applies to various configurations of data processing apparatus connected to UPSs, with varying results, depending on the uses to which the apparatus is put.

It is thus possible, in the exemplary data storage case, to lose data as a result of configurations where the serial cable is not connected to the UPS powering the node, but to a different UPS powering a different node.

The normal system design of an exemplary data storage configuration relies upon the signal cable between the storage product node and the UPS connecting to the correct UPS. If this is not the case then a node can be powered down without the contents of its fast write cache and metadata being copied to the node's internal disk drive.

A number of steps are taken already in the conventional design to ensure correct cabling but unfortunately none of the existing checks can detect the case where the signal cable for a specific node is connected to a UPS which is not supplying that actual node with power. A common mistake is to cross connect the signal and power cables between two consumer nodes and two UPSs, such that the power cable of one UPS the signal cable of a different UPS are connected to each node, although other misconfigurations are possible.

In the case of a typical system according to the prior art which has been cross-connected in this way, when one node is shut down it stops refreshing the keepalive timer in the UPS powering its partner node. When this keepalive timer expires, the partner node, which may be the only operational node in the system, is powered off unexpectedly.

It is possible to alleviate the problem using the following known techniques:

1. Tightly integrating the UPS with the node. This is a poor solution to the problem because it leads to inflexibility in the design. Potentially the power consuming product is tied to one UPS vendor or to designing and manufacturing custom UPS hardware for each processing complex used.

2. Integrated supply and data cable. This is a poor solution to the problem because vendors of the currently available UPSs have not designed their UPSs with this in mind.

3. Physically tying together the supply and data cable. This solution is actually used today, but unfortunately it is impossible to make a cable which cannot be plugged into the wrong UPS if the UPSs are physically close together.

It would therefore be desirable to provide some degree of automation of the checking process and/or to offer protection against the problems described, thus reducing the potential for human error to cause severe system errors.

SUMMARY OF THE INVENTION

According to a first general aspect of the present invention, there is provided a logic arrangement for reducing incidence of errors in connections between a power consumer apparatus and a power supply apparatus, the logic arrangement comprising: a pattern-generating component for generating an identifiable pattern in a load to be drawn from a power supply connection to a power supply apparatus; and a testing component for monitoring across a signal connection to the power supply apparatus, the testing component monitoring for a change in the load corresponding to the pattern. A positive result of the testing by the testing component indicates a correct configuration.

According to a second general aspect of the present invention, there is provided a logic arrangement for reducing incidence of errors in connections between a power consumer apparatus and a power supply apparatus, the logic arrangement comprising: a pattern-generating component for generating an identifiable pattern for a patterned load to be drawn from a power supply connection; a load-drawing component, preferably responsive to said pattern-generating component, for drawing said patterned load from said power supply connection; and a testing component at said power consumer apparatus for testing across a signal connection for a responsive supply to satisfy demand for said patterned load by said power supply apparatus. A positive result of the testing by the testing component indicates a correct configuration.

In a third general aspect, the present invention provides a method of operating a logic arrangement for reducing incidence of errors in connections between a power consumer apparatus and a power supply apparatus, the method comprising: generating, by a pattern-generating component, an identifiable pattern for a patterned load to be drawn from a power supply connection; responsive to said pattern-generating component, drawing, by a load-drawing component, said patterned load from said power supply connection; and testing, by a testing component at said power consumer apparatus, across a signal connection for a responsive supply to satisfy demand for said patterned load by said power supply apparatus.

In a fourth general aspect, the present invention provides a method of operating a logic arrangement for reducing incidence of errors in connections between a power consumer apparatus and a power supply apparatus, the method comprising: generating an identifiable pattern in a load to be drawn from a power supply connection to a power supply apparatus; monitoring for a change in the load corresponding to the pattern, the monitoring being performed across a signal connection to the power supply apparatus. A positive result of the monitoring indicates a correct configuration.

In yet another general aspect, the present invention provides a computer program comprising computer program code to, when loaded onto a computer system and executed thereon, cause said computer system to perform the steps of any of the methods presented herein.

Other aspects and advantages of the present invention will become apparent from the following detailed description, which, when taken in conjunction with the drawings, illustrate by way of example the principles of the invention.

BRIEF DESCRIPTION OF THE DRAWINGS

For a filler understanding of the nature and advantages of the present invention, as well as the preferred mode of use, reference should be made to the following detailed description read in conjunction with the accompanying drawings.

DETAILED DESCRIPTION

Figure 1:
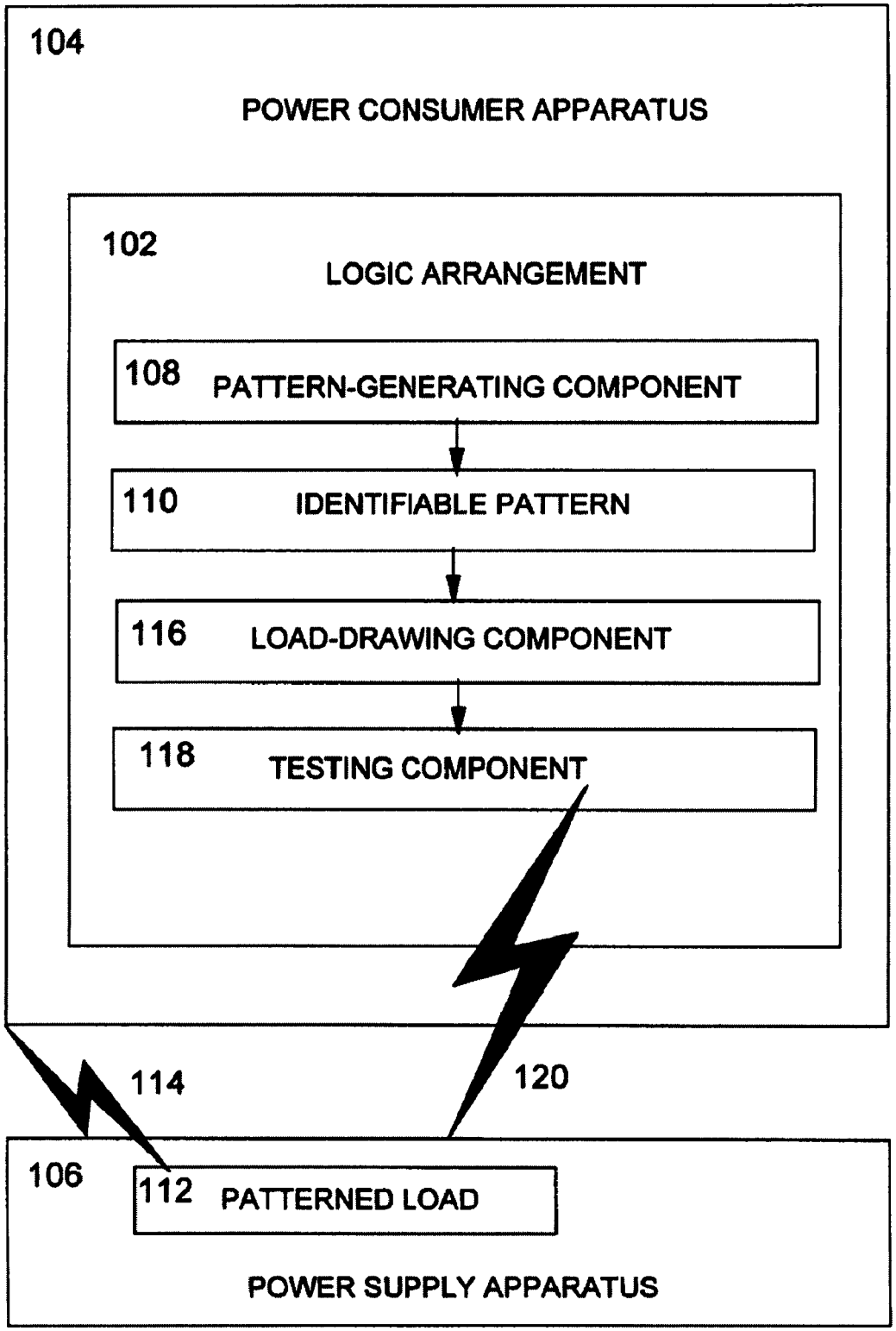
FIG. 1 is a diagram of a configuration comprising apparatus in which the teaching of the present invention may be practised.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of methods and apparatuses for improving reliability of systems connected to "intelligent" power supply apparatus.

For brevity and clarity, various embodiments of the invention, including preferred embodiments, will be described against a background of a data storage apparatus using a UPS, but it will be clear to one skilled in the art that they are not limited to use in such an environment. In particular, it will be readily apparent to one skilled in the art that many other potential power-supply "consumer" systems exist in the field of data processing, and that the systems and methods of the present disclosure would have equal applicability in those systems.

According to a first general aspect of the present invention, there is provided a logic arrangement for reducing incidence of errors in connections between a power consumer apparatus and a power supply apparatus, the logic arrangement comprising: a pattern-generating component for generating an identifiable pattern in a load to be drawn from a power supply connection to a power supply apparatus; and a testing component for monitoring across a signal connection to the power supply apparatus, the testing component monitoring for a change in the load corresponding to the pattern. A positive result of the testing by the testing component indicates a correct configuration.

According to a second general aspect of the present invention, there is provided a logic arrangement for reducing incidence of errors in connections between a power consumer apparatus and a power supply apparatus, the logic arrangement comprising: a pattern-generating component for generating an identifiable pattern for a patterned load to be drawn from a power supply connection; a load-drawing component, preferably responsive to said pattern-generating component, for drawing said patterned load from said power supply connection; and a testing component at said power consumer apparatus for testing across a signal connection for a responsive supply to satisfy demand for said patterned load by said power supply apparatus. A positive result of the testing by the testing component indicates a correct configuration.

In a third general aspect, the present invention provides a method of operating a logic arrangement for reducing incidence of errors in connections between a power consumer apparatus and a power supply apparatus, the method comprising: generating, by a pattern-generating component, an identifiable pattern for a patterned load to be drawn from a power supply connection; responsive to said pattern-generating component, drawing, by a load-drawing component, said patterned load from said power supply connection; and testing, by a testing component at said power consumer apparatus, across a signal connection for a responsive supply to satisfy demand for said patterned load by said power supply apparatus.

In a fourth general aspect, the present invention provides a method of operating a logic arrangement for reducing incidence of errors in connections between a power consumer apparatus and a power supply apparatus, the method comprising: generating an identifiable pattern in a load to be drawn from a power supply connection to a power supply apparatus, monitoring for a change in the load corresponding to the pattern, the monitoring being performed across a signal connection to the power supply apparatus. A positive result of the monitoring indicates a correct configuration.

In yet another general aspect, the present invention provides a computer program comprising computer program code to, when loaded onto a computer system and executed thereon, cause said computer system to perform the steps of any of the methods presented herein.

Potential advantages of the preferred embodiments of the present invention over the other known solutions may include:

1. They can be implemented entirely as a logic arrangement embodied in software, in which case no changes are required to the commercially available UPS hardware or firmware.

2. They cope with configurations where multiple nodes draw power from the same UPS.

3. They cannot be circumvented by mis-cabling.

One preferred embodiment of the present invention contemplates adding some logic, which may be implemented in software, hardware or a combination of software and hardware, and which may be invoked during the node boot process or at other times to detect misconfigurations and to indicate a possible error and/or prevent a node which is misconfigured from booting and thus becoming dependent on the behaviour of a UPS the state of which cannot be correctly determined from any information received on the signal cable.

In a preferred embodiment, a logic arrangement injects a patterned signal onto the power cable by causing the node to draw more or less current whilst simultaneously monitoring the current being drawn from the UPS in order to detect the signal. If the correct signal injected onto the power cable cannot be detected using the serial interface, the system may be misconfigured.

Intelligent UPS apparatus according to the prior art contains a load monitor which is readable from the programming interface over the serial cable. A power meter samples the load.

Turning now to FIG. 1, there is shown a logic arrangement 102 for reducing incidence of errors in connections between a power consumer apparatus 104 and a power supply apparatus 106. The logic arrangement comprises a pattern-generating component 108 for generating an identifiable pattern 110 for a patterned load 112 to be drawn from a power supply connection 114. The logic arrangement further comprises a load-drawing component 116, responsive to pattern-generating component 108, for drawing the patterned load 112 from the power supply connection 114; and a testing component 118 at the power consumer apparatus 104 for testing across a signal connection 120 for a responsive supply to satisfy demand for said patterned load 112 by said power supply apparatus 106.

The power consumer apparatus 104 may be a data storage apparatus, such as a storage controller apparatus, for example, a storage virtualization controller apparatus. However, as noted above, the power consumer apparatus 104 may be any type of consumer device.

The power supply apparatus 106 may be an intelligent UPS apparatus. However, as noted above, the power supply apparatus 106 may be any type of power supply device.

The pattern-generating component 108 may generate an identifiable bit-pattern and the testing component 118 may test for an identifiable bit-pattern encoded in the responsive supply. The testing component may test for an identifiable bit-pattern encoded in said responsive supply using a midpoint crossing detection technique. In one alternative, the testing component may test for an identifiable bit-pattern encoded in said responsive supply using a rising curve detection technique.

In one example, a load-drawing component 116 may comprise a processor component drawing a load to perform processing; in another, the load-drawing component may comprise a transducer component drawing a load to convert electrical to mechanical power. In the second case, for example, the transducer component may be operatively coupled to a storage device drawing a load to convert electrical to mechanical power.

In a preferred embodiment, a node, which is not connected via a serial cable to the UPS which powers it, does not boot. Instead it reports a UPS cabling fault using any of the conventionally-available means for reporting UPS cabling faults, such as a warning on a monitor screen, a warning light display, an audible alarm, etc.

During the boot sequence the code pulses out a binary number on the power supply by alternately running a CPU intensive process and then stopping it. The selected binary sequence is related to the node such that it is very unlikely that two nodes will select the same number. An 8-bit number selected randomly upon each boot would be sufficient to achieve adequate accuracy in most cases. If fixed numbers are used they may have to be longer than 8 bits to avoid the chance that two nodes choose the same number.

Figure 2:
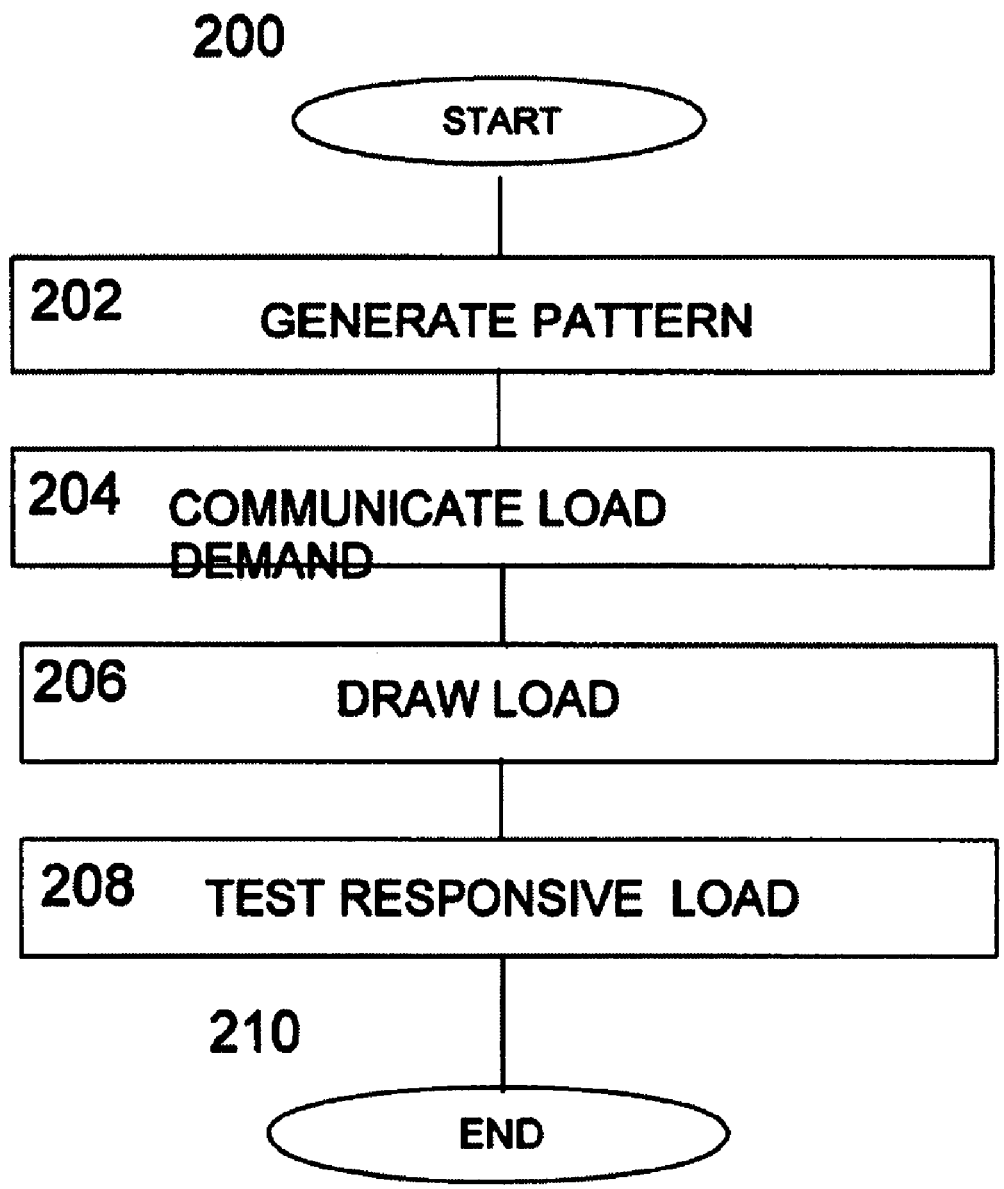
FIG. 2 is a flow diagram of a method for operating apparatus in accordance with a preferred embodiment of the present invention.

Turning to FIG. 2, there is shown a flow diagram of a method of operating a logic arrangement for reducing incidence of errors in connections between a power consumer apparatus and a power supply apparatus according to a preferred embodiment of the present invention.

After "start" step 200, at step 202 a pattern-generating component generates an identifiable pattern for a patterned load to be drawn from a power supply connection. The patterned load is communicated at step 204, and at step 206 a load-drawing component responsive to the pattern-generating component draws the patterned load from the power supply connection. At step 208, a testing component at the power consumer apparatus, tests via a signal connection for a responsive supply to satisfy demand for the patterned load by the power supply apparatus. At step 210, the process ends.

EXAMPLE 1

In more detail, one method of operation of a logic arrangement according to a preferred embodiment of the present invention (with the sample interval set to slightly longer than the maximum time taken for the UPS load meter to register a change in load) may be represented in conventional pseudo-code as follows:

```
While (we have not failed to boot 10 times)
do
{
  While (we have not determined the idle/busy threshold)
  do
  {
    Set the processor to idle. Wait for the sample interval. Measure the
load for idle processor.
    Set the processor to busy. Wait for the sample interval. Measure the
load for busy processor.
    if( (busy power – idle power) < predefined acceptable difference )
    then
```

We can't tell the difference between idle and busy. This might be because the cabling is wrong or that the current draw of another node on the same UPS varied by a similar and opposite amount.

```
    if we have failed to determine the threshold more than twice
      then
        Signal a cabling fault but continue to try to boot
      else
        Wait a random small multiple of the time taken to pulse the
whole code out (say between 1 and 5 times)
  }
```

The decision load is the midpoint between these busy and idle values. Loads sampled below this decision point are counted as 0s, above are counted as 1s.

```
For each bit in the pattern
do
  {
  set the load state (high or low depending on the bit being 1 or 0)
  Wait for the sample time
  Sample the bit. If the value is not as expected then break else continue
  }
If (The bit pattern has been detected correctly) -
  exit to boot
else
  {
```

The bit pattern has not been detected correctly. This may be because another node was booting at the same time or because the load on another node was fluctuating wildly during the sample period.

```
    If we have failed to boot 5 times - signal a cabling fault but continue
to try to boot
        wait a random small multiple of the time taken to pulse the whole
code out (say between 1 and 5 times)
            continue
        }
}
```

A precondition for the midpoint crossing algorithm to work is that the UPS power meter must provide a response curve whose rising and falling slopes are symmetrical within the time domain about the peak power value obtained in response to a high power pulse in the UPS load. Under some types of load some UPS devices provide such a power meter response curve; however under other types of load an asymmetrical response curve is obtained where the gradient of the falling slope is much less than that of the rising slope, causing the midpoint crossing detection method to fail.

To solve the problem a new method, shown below in Example 2, may be used with such a UPS. It measures only the rising slopes of the UPS meter response curve and ignores readings from the falling slopes.

EXAMPLE 2

In this alternative implementation, suitable for use with UPS devices for which the supply response curve differs in this way, a method of operation according to the following pseudo-code may be implemented:

```
while (we have not failed to boot 10 times)
{
  obtain a random 8-bit pattern;
  For each bit in the pattern:
  {
    if the bit value is 0:
    {
      wait for the sample time;
      read the UPS meter;
      wait for the sample time;
      read the UPS meter a second time;
      calculate the difference between the second and first readings;
      if the difference is less than the noise margin, the correlation
      is successful, else unsuccessful;
    }
    if the bit value is 1:
    {
      wait for the sample time;
      read the UPS meter;
      start running the high-power consumption task;
      wait for the sample time;
      read the UPS meter a second time;
      stop running the high-power consumption task;
      calculate the difference between the second and first readings;
      if the difference is greater than the noise margin, the
      correlation is successful, else unsuccessful;
    }
  }
  if all bits have been successfully correlated
  {
    exit to boot;
  }
  else if system has not failed to boot 10 times
  {
    the test may have failed because another node was performing
    the test simultaneously; wait for a small random multiple of
    the execution time of the full 8-bit correlation test then retry;
  }
  else if system has failed to boot 10 times
  {
```

```
    signal a cabling fault;
  }
}
```

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array or application specific integrated circuit. Such a logic arrangement may further be embodied in enabling means for temporarily or permanently establishing logical structures in such an array or circuit using, for example, a virtual hardware descriptor language, which may be stored and transmitted using fixed or transmittable carrier media.

Figure 3:
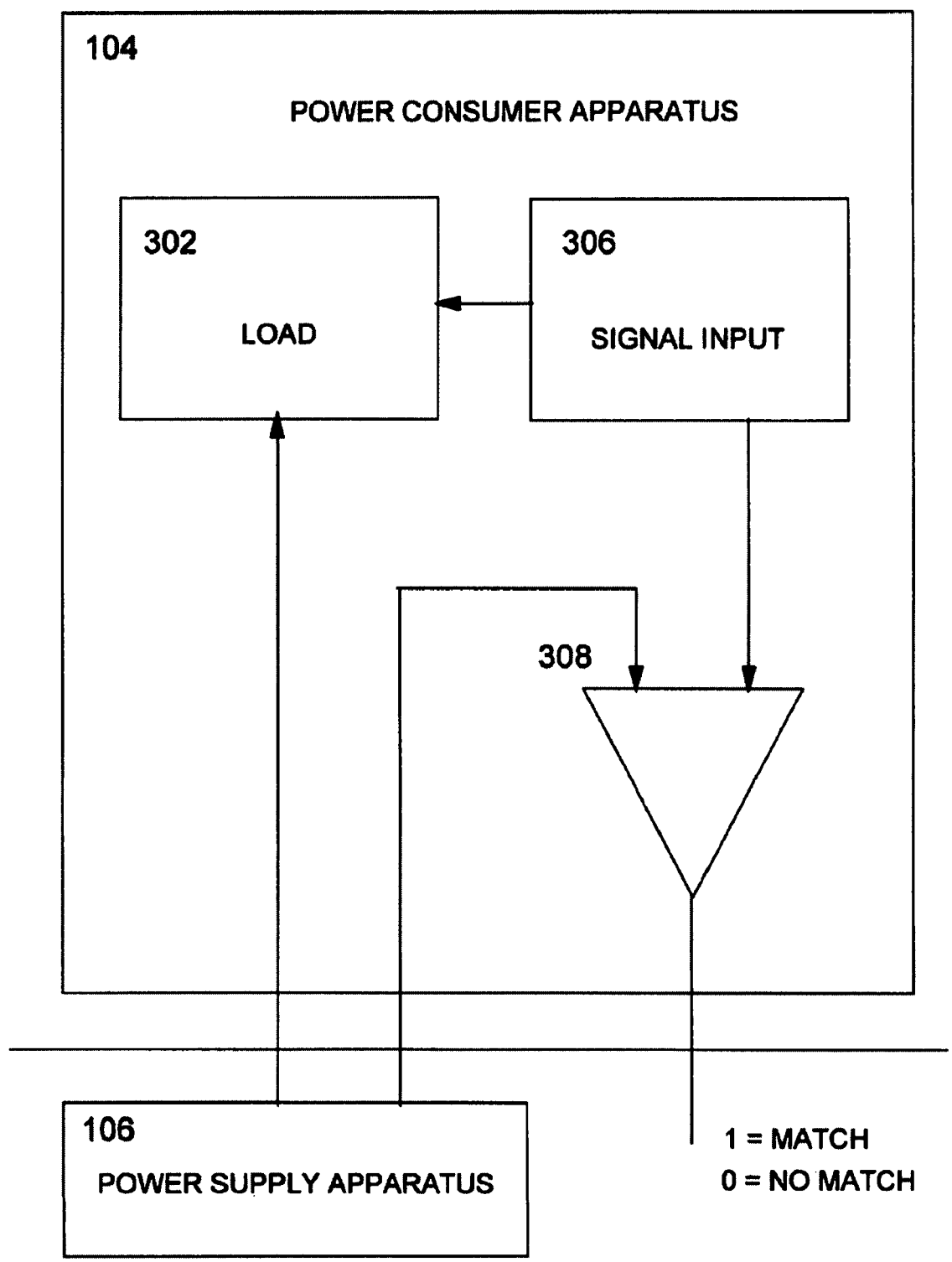
FIG. 3 is a schematic diagram of a logic arrangement according to a preferred embodiment of the present invention.

For example, turning to FIG. 3, there is shown a simplified representation of a logic arrangement according to a preferred embodiment of the present invention, in which a power consumer apparatus 104 draws a load 302 from a power supply apparatus 106. The load is patterned, as described above, and controlled using signal input 306. Signal input 306 also provides its values to comparator 308, which is arranged to receive values from signal input 306 and from power supply apparatus 106 at its inputs. Comparator 308 outputs a signal representing MATCH or NO MATCH, here represented by 1 and 0, respectively. It will be clear to one of ordinary skill in the art that such an arrangement lends itself to implementation in the various forms described herein, and in variations and modifications thereof.

It will be appreciated that the method and arrangement described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A logic arrangement for reducing incidence of errors in connections between a power consumer apparatus and a power supply apparatus, the logic arrangement comprising:
   a pattern-generating component on a power consumer apparatus for generating an identifiable pattern in a load to be drawn from a power supply connection to the power supply apparatus;
   a testing component on the power consumer apparatus for monitoring across a signal connection to the power supply apparatus, the testing component monitoring for a change in the load corresponding to the pattern;
   wherein a positive result of the testing by the testing component indicates a correct configuration.

2. The logic arrangement of claim 1, wherein the power consumer apparatus is a data storage apparatus.

3. The logic arrangement of claim 1, wherein the power supply apparatus is an intelligent UPS apparatus.

4. The logic arrangement of claim 1, wherein the pattern-generating component generates an identifiable bit-pattern.

5. The logic arrangement of claim 4, wherein the identifiable bit-pattern is encoded by causing the power consumer apparatus to vary the amount of power drawn from the power supply connection in a manner corresponding to the identifiable bit-pattern.

6. The logic arrangement of claim 1, wherein the testing component tests for an identifiable bit-pattern encoded in the load using a midpoint crossing detection technique.

7. The logic arrangement of claim 1, wherein the testing component tests for an identifiable bit-pattern encoded in the responsive supply using a rising curve detection technique.

8. The logic arrangement of claim 1, further comprising a load-drawing component for drawing the load from the power supply connection.

9. The logic arrangement of claim 8, wherein the load-drawing component, in response to signals from the pattern-generating component, uses varying amounts of power, thereby encoding the pattern in the load.

10. The logic arrangement of claim 9, wherein the testing component receives signals from the power supply apparatus indicating a change in load being drawn from the power supply apparatus.

11. A logic arrangement in a power consumer apparatus for reducing incidence of errors in connections between the power consumer apparatus operable to draw a load and a power supply apparatus capable of varying the power supplied, the logic arrangement comprising:
   a pattern-generating component in a power consumer apparatus for generating an identifiable pattern for a patterned load to be drawn from a power supply connection;
   a load-drawing component for drawing the patterned load from the power supply connection; and
   a testing component at the power consumer apparatus for testing across a signal connection for a responsive supply to satisfy demand for the patterned load by the power supply apparatus;
   wherein a positive result of the testing by the testing component indicates a correct configuration.

12. The logic arrangement of claim 11, wherein the power consumer apparatus is a data storage apparatus.

13. The logic arrangement of claim 11, wherein the power supply apparatus is an intelligent UPS apparatus.

14. The logic arrangement of claim 11, wherein the pattern-generating component generates an identifiable bit-pattern.

15. The logic arrangement of claim 14, wherein the identifiable bit-pattern is encoded by causing the power consumer apparatus to vary the amount of power drawn from the power supply connection in a manner corresponding to the identifiable bit-pattern.

16. The logic arrangement of claim 11, wherein the testing component tests for an identifiable bit-pattern encoded in the load using a midpoint crossing detection technique.

17. The logic arrangement of claim 11, wherein the testing component tests for an identifiable bit-pattern encoded in the responsive supply using a rising curve detection technique.

18. The logic arrangement of claim 11, wherein the load-drawing component, in response to signals from the pattern-generating component, uses varying amounts of power, thereby encoding the pattern in the load.

19. The logic arrangement of claim 18, wherein the testing component receives signals from the power supply apparatus indicating a change in load being drawn from the power supply apparatus.

20. A method for reducing incidence of errors in connections between a power consumer apparatus operable to draw a load and a power supply apparatus capable of varying the power supplied, the method comprising:
   generating at the power consumer apparatus an identifiable pattern in a load to be drawn from a power supply connection to a power supply apparatus;
   monitoring at the power consumer apparatus for a change in the load corresponding to the pattern, the monitoring being performed across a signal connection to the power supply apparatus;
   wherein a positive result of the monitoring indicates a correct configuration.

21. The method of claim 20, wherein the power consumer apparatus is a data storage apparatus.

22. The method of claim 20, wherein the power supply apparatus is an intelligent UPS apparatus.

23. The method of claim 20, wherein the pattern is an identifiable bit-pattern.

24. The method of claim 23, wherein the identifiable bit-pattern is encoded by causing the power consumer apparatus to vary the amount of power drawn from the power supply connection in a manner corresponding to the identifiable bit-pattern.

25. The method of claim 20, wherein the monitoring includes testing for an identifiable bit-pattern encoded in the load using a midpoint crossing detection technique.

26. The method of claim 20, wherein the monitoring includes testing for an identifiable bit-pattern encoded in the responsive supply using a rising curve detection technique.

27. The method of claim 20, further comprising causing a load-drawing component to use varying amounts of power, thereby encoding the pattern in the load.

28. A method of operating a logic arrangement in a power consumer apparatus for reducing incidence of errors in connections between the power consumer apparatus operable to draw a load and a power supply apparatus capable of varying the power supplied, the method comprising steps of:
- generating, by a pattern-generating component, an identifiable pattern for a patterned load to be drawn from a power supply connection;
- drawing, by a load-drawing component, the patterned load from the power supply connection; and
- testing, by a testing component at the power consumer apparatus, across a signal connection for a responsive supply to satisfy demand for the patterned load by the power supply apparatus;
- wherein a positive result of the testing by the testing component indicates a correct configuration.

29. The method of claim 28, wherein the power consumer apparatus is a data storage apparatus, and wherein the power supply apparatus is an intelligent UPS apparatus.

30. The method of claim 28, wherein the testing component tests for an identifiable bit-pattern encoded in the responsive supply using a midpoint crossing detection technique.

31. The method of claim 28, wherein the testing component tests for an identifiable bit-pattern encoded in the responsive supply using a rising curve detection technique.

32. A computer program comprising computer program code which, when executed by a computer system, causes the computer system to perform a method comprising:
- generating an identifiable pattern in a load to be drawn from a power supply connection to a power supply apparatus;
- monitoring at the power supply apparatus for a change in the load corresponding to the pattern, the monitoring being performed across a signal connection to the power supply apparatus;
- wherein a positive result of the monitoring indicates a correct configuration.

* * * * *